(12) United States Patent
Zhao

(10) Patent No.: US 11,573,560 B2
(45) Date of Patent: Feb. 7, 2023

(54) ROBOT AND A SYSTEM AND METHOD OF TRANSPORTING MATERIALS USING THE ROBOT

(71) Applicant: SUZHOU XINYOUHUA INVESTMENT ADVISOR CO., LTD., Suzhou (CN)

(72) Inventor: Junwei Zhao, Suzhou (CN)

(73) Assignee: SUZHOU XINYOUHUA INVESTMENT ADVISOR CO., LTD., Suzhou (CN)

( * ) Notice: Subject to any disclaimer, the term of this patent is extended or adjusted under 35 U.S.C. 154(b) by 920 days.

(21) Appl. No.: 16/330,155

(22) PCT Filed: May 17, 2018

(86) PCT No.: PCT/CN2018/087296
§ 371 (c)(1),
(2) Date: Mar. 4, 2019

(87) PCT Pub. No.: WO2019/100672
PCT Pub. Date: May 31, 2019

(65) Prior Publication Data
US 2021/0323771 A1    Oct. 21, 2021

(30) Foreign Application Priority Data

Nov. 22, 2017  (CN) .......................... 201711170827.7

(51) Int. Cl.
*G05B 19/418*    (2006.01)
*B25J 9/16*        (2006.01)
(Continued)

(52) U.S. Cl.
CPC ........ *G05B 19/41895* (2013.01); *B25J 5/007* (2013.01); *B25J 9/1666* (2013.01);
(Continued)

(58) Field of Classification Search
CPC ........ G05B 19/41895; G05B 19/41865; G05B 2219/31002; G05B 2219/31197; G05B 2219/50393; G05D 1/0225
See application file for complete search history.

(56) References Cited

U.S. PATENT DOCUMENTS 9,411,337 B1 *  8/2016  Theobald ............. G05D 1/0225
10,351,240 B1 *  7/2019  Sills ......................... B64F 1/00
(Continued)

FOREIGN PATENT DOCUMENTS

| CN | 1229051 A | 9/1999 |
|---|---|---|
| CN | 205953006 U | 2/2017 |

(Continued)

*Primary Examiner* — Thomas Randazzo
(74) *Attorney, Agent, or Firm* — SZDC Law P.C.

(57) ABSTRACT

The invention discloses a material transport method between process points of a photovoltaic production line. A mobile robot receives an instruction to transport materials from one process point to another, and the mobile robot and the process point dock based on near field communication to take or discharge materials. In the operation method and system of the invention, the flower baskets are transported from one process point to another on the photovoltaic production line by means of a mobile robot instead of manual human effort, significantly improving the automation degree and production efficiency of the photovoltaic production line, ensuring transportation safety, and reducing labor cost.

7 Claims, 3 Drawing Sheets

(51) Int. Cl.
    *B25J 5/00*    (2006.01)
    *B65G 37/00*   (2006.01)
    *G05D 1/02*    (2020.01)
(52) U.S. Cl.
    CPC .......... *B25J 9/1684* (2013.01); *B25J 9/1697* (2013.01); *B65G 37/00* (2013.01); *G05B 19/41865* (2013.01); *G05D 1/0225* (2013.01); *G05B 2219/31002* (2013.01); *G05B 2219/31197* (2013.01); *G05B 2219/50393* (2013.01)

(56) References Cited

U.S. PATENT DOCUMENTS

| | | | |
|---|---|---|---|
| 2010/0138017 A1* | 6/2010 | Vrba | G05B 19/4188 700/97 |
| 2011/0199194 A1* | 8/2011 | Waldock | G05B 19/12 340/10.51 |
| 2012/0323365 A1* | 12/2012 | Taylor | G05D 1/0242 901/1 |
| 2017/0191822 A1* | 7/2017 | Becker | G01B 21/042 |
| 2017/0320210 A1 | 11/2017 | Ding et al. | |
| 2018/0232839 A1* | 8/2018 | Heinla | G06Q 10/0832 |
| 2018/0309188 A1* | 10/2018 | Jeon | H04B 5/06 |
| 2019/0183737 A1* | 6/2019 | Valerino, Sr. | B65G 51/26 |

FOREIGN PATENT DOCUMENTS

| | | |
|---|---|---|
| CN | 106927244 A | 7/2017 |
| CN | 107160403 A | 9/2017 |
| CN | 107369641 A | 11/2017 |
| CN | 107963416 A | 4/2018 |

\* cited by examiner

ROBOT AND A SYSTEM AND METHOD OF TRANSPORTING MATERIALS USING THE ROBOT

This application is the National Stage Application of PCT/CN2018/087296, filed on May 17, 2018, which claims priority to Chinese Patent Application No.: 201711170827.7, filed on Nov. 22, 2017, which is incorporated by reference for all purposes as if fully set forth herein.

TECHNICAL FIELD

The invention relates to a robot, a system and method of transporting materials between process points of a photovoltaic production line using the robot.

BACKGROUND OF THE INVENTION

Solar power generation is an emerging renewable energy technology. The main industrialization applications are solar photovoltaic power generation and solar thermal power generation. Solar photovoltaic power generation has the characteristics of modular battery components, convenient installation and maintenance, and flexible use mode, which is used most widely about solar power generation technology. Solar photovoltaic power generation system is a new type of power generation system that utilizes the photovoltaic effect of semiconductor materials to directly convert solar radiation energy into electrical energy. Photovoltaic power generation system comprises thin solid photovoltaic cells made of semiconductor materials such as silicon wafers. The silicon wafer is one of the main products of domestic and foreign photovoltaic companies. At the current stage, domestic and foreign PV companies have achieved relatively high automation in the production process, but the transportation of silicon wafers from one process point to another in the workshop is still done by humans. In the actual production process, the silicon wafers are first put into the flower baskets (also called discs box), and then manually loaded on a trolley, and in the manner that "workers push the trolley", to complete the delivery of the flower baskets. The transportation volume per person is small, thus a large number of workers are required. Besides, the transportation efficiency is low, so the production efficiency of the whole workshop is severely limited. At the same time, the silicon wafer itself is thin and brittle, and is easy to be damaged during the transportation process, and the safety and efficiency of the whole production are low.

SUMMARY OF THE INVENTION

The technical problem to be solved by the present invention is to provide a materials transporting method, wherein the flower baskets are transported from one process point to another on the photovoltaic production line by means of a mobile robot instead of manual human effort significantly improving the automation degree and production efficiency of the photovoltaic production line, ensuring the safety of transportation and reducing labor costs.

In order to solve the technical problem above, the present invention provides a material transporting method between process points of a photovoltaic production line, wherein a mobile robot receives an instruction to transport materials from one process point to another and the mobile robot and the process points dock based on the near field communication to take or discharge materials.

In a preferred embodiment of the present invention, the method further includes the following steps:

(1) A robot scheduling system obtains task information, and sends the task information to a mobile robot that is most suitable for performing the task. The task information at least includes a process point from which the materials are taken, a process point to which the materials are discharged, material quantity to be taken, and material quantity to be discharged.

(2) The mobile robot receives the task information sent by the robot scheduling system, and moves to a first process point by autonomous navigation, and determines whether a material transmission condition is satisfied based on the near field communication between the mobile robot and the first process point. When the material transmission condition is satisfied, a transmission line on the mobile robot is docked with a transmission line at the first process point, and the materials at the first process point are transported to the mobile robot;

(3) The mobile robot autonomously navigates to a second process point, and the mobile robot and the second process point determine whether a material transmission condition is satisfied based on the near field communication. The transmission line on the mobile robot is docked with a transmission line on the second process point when the material transmission condition is satisfied and the materials on the mobile robot are transported to the second process point.

In a preferred embodiment of the present invention, further comprising an MES system of the photovoltaic production line generates the task information according to actual production conditions, and sends the task information to the first process point and the second process point. After receiving the task information, the first process point and the second process point analyze whether the materials entry and exit conditions are satisfied. When the materials entry and exit conditions of the first process point and the second process point are satisfied simultaneously, the MES system sends the task information to the robot scheduling system.

In a preferred embodiment of the present invention, further comprising that, after the transmission line on the mobile robot and the transmission line at the process point are docked, the steps of completing the materials transportation, including:

(S1) The process point and the mobile robot exchange handshake signals;

(S2) After the process point and the mobile robot shake hands successfully, the process point sends its current material status to the mobile robot, and the mobile robot analyzes the material status of the process point, generates an action command, and sends the action command to the process point, the action command includes a transmission line serial number of the docked transmission line, transmission direction, transmission speed and transmission time;

(S3) The process point receives the action command and determines whether there is a conflict with the current material, executing the action command when there is no conflict. The transmission line on the process point and that on the mobile robot moves at a same speed and in a same direction, and the materials are one by one transferred from the transmission line on the process point to the transmission line on the mobile robot, or are one by one transferred from the transmission line on the mobile robot to the transmission line on the process point;

(S4) The one where the materials are taken from reads and stores the information of the taken materials one by one, and updates its information list; the receiver of the materials reads and stores the information of the incoming materials one by one, and updates its information list;

(S5) The mobile robot detects whether there are materials at the end of the transmission line, and if there is no material, it sends a detach request to the process point. The process point receives the detach request, and detects whether there are materials at the end of its own transmission line, and if there is no material, it sends a consent to the mobile robot. After receiving the consent to detach, the mobile robot retreats and completes one transportation task;

(S6) After completion of one task, the mobile robot transmits the updated information list to the robot scheduling system, and the process point transmits the updated information list to the MES system.

In a preferred embodiment of the present invention, further comprising, when the mobile robot moves to a position near the process point, positioning the current position of the mobile robot by using an auxiliary positioning system; the auxiliary positioning system includes:

A magnetic strip disposed on the ground and a magnetic strip detecting sensor disposed on the mobile robot;

Or a marker with a precise position disposed at a target position and an identification sensor disposed on the mobile robot;

Or a ribbon disposed on the ground and a visual sensor disposed on the mobile robot.

In a preferred embodiment of the present invention, further comprising, in step (2), the selection criterion of the robot scheduling system to select the mobile robot most suitable for performing the task, including: moving to the first process point in the shortest time, moving to the first process point in the shortest distance, and improving the usage rate of mobile robots.

In order to solve the technical problems above, the present invention provides a material transport system between process points of a photovoltaic production line, including a mobile robot, which receives instructions to transport materials from one process point to another. Both the mobile robot and the process point are provided with a near field communication module. The mobile robot and the process point dock based on the near field communication to take or discharge materials.

In a preferred embodiment of the present invention, further comprising a robot scheduling system. The robot scheduling system obtains task information, and sends the task information to the mobile robot that is most suitable for performing the task. The task information at least includes a process point from which the materials are taken, a process point to which the materials are discharged, material quantity to be taken, and material quantity to be discharged;

The mobile robot receives the task information from the robot scheduling system, and moves to the first process point by autonomous navigation, and the mobile robot and the first process point determine whether a material transmission condition is satisfied based on near field communication between the mobile robot and the first process point. When the material transmission condition is met, the transmission line of the mobile robot is docked with the transmission line at the first process point, and the materials at the first process point are transported to the mobile robot;

After the mobile robot taking materials from the first process point, it autonomously navigates to a second process point, and the mobile robot and the second process point determine whether a material transmission condition is satisfied based on the near field communication. And if the material transmission condition is satisfied, the transmission line of the mobile robot is docked with a transmission line at the second process point, and the materials on the mobile robot are transported to the second process point.

In order to solve the technical problem above, the present invention further provides a mobile robot, including a robot body, a transmission line, a near field communication module, a positioning and navigation module, a path planning module, an auxiliary positioning module, a position detecting module, and a central controller. The near field communication module is disposed directly below the transmission line; the transmission line is used for storing and transporting materials; the positioning and navigation module is configured to guide the robot body to move to a target position, and the auxiliary positioning module is used for guiding the robot body to be accurately located at the target position; the near field communication module is used to let the mobile robot communicate with a target process point when the mobile robot is positioned at the target location; the path planning module is configured to plan a path for the robot body moving from one target position to another; the position detection module is used for position confirmation when the robot body is located at the target position; the central controller is used for analyzing and processing data in the robot's software.

In a preferred embodiment of the present invention, the robot body is further provided with a main laser sensor, an ultrasonic sensor, a side obstacle avoidance laser sensor, a safety sensor and a non-contact sensor. The main laser sensor scans an entire plane where the robot body is located, for positioning of the robot body and danger warning by means of plane features; the ultrasonic sensor is used for detecting obstacles near the ground; the side obstacle avoidance laser sensor is used for scanning both sides of the robot body; the safety sensor is used to detect whether there is material at the installation position of the safety sensor; the non-contact sensor is disposed at the end of the transmission line for detecting whether there is material at the end of the transmission line.

In the operation method and system of the invention, the flower baskets are transported from one process point to another on the photovoltaic production line by means of a mobile robot instead of manual human effort, significantly improving the automation degree and production efficiency of the photovoltaic production line, ensuring the safety of transportation and reducing labor costs.

DETAILED DESCRIPTION OF THE EMBODIMENTS

The present invention will be further illustrated in conjunction with the figures and specific embodiments, which are to be better understood and implemented by those skilled in the art, but the embodiments are not limited thereto for the present application.

Embodiment I

The embodiment provides a material transportation method between each process point of the photovoltaic production line. The mobile robot receives an instruction to transport the material from one process point to another. The mobile robot and the process point dock based on the near field communication to take or discharge materials. In the technical solution of the embodiment, the material transferred between the process points is a flower basket loaded with silicon wafers. However, in fact, it can also be used to transport other materials between process points, depending on the actual use. The type of materials to be transported does not constitute a limitation of this embodiment.

In this embodiment, the main equipment for completing material transportation between the process points of the photovoltaic production line includes a robot scheduling system and one or more mobile robots. It is known that the current MES system has been planned on the photovoltaic production line, and all process points on the photovoltaic production line are controlled by the MES system. The photovoltaic workshop is covered with a Wi-Fi network, and the robot scheduling system communicates with the MES system based on the Wi-Fi network.

Mobile Robot

Figure 1:
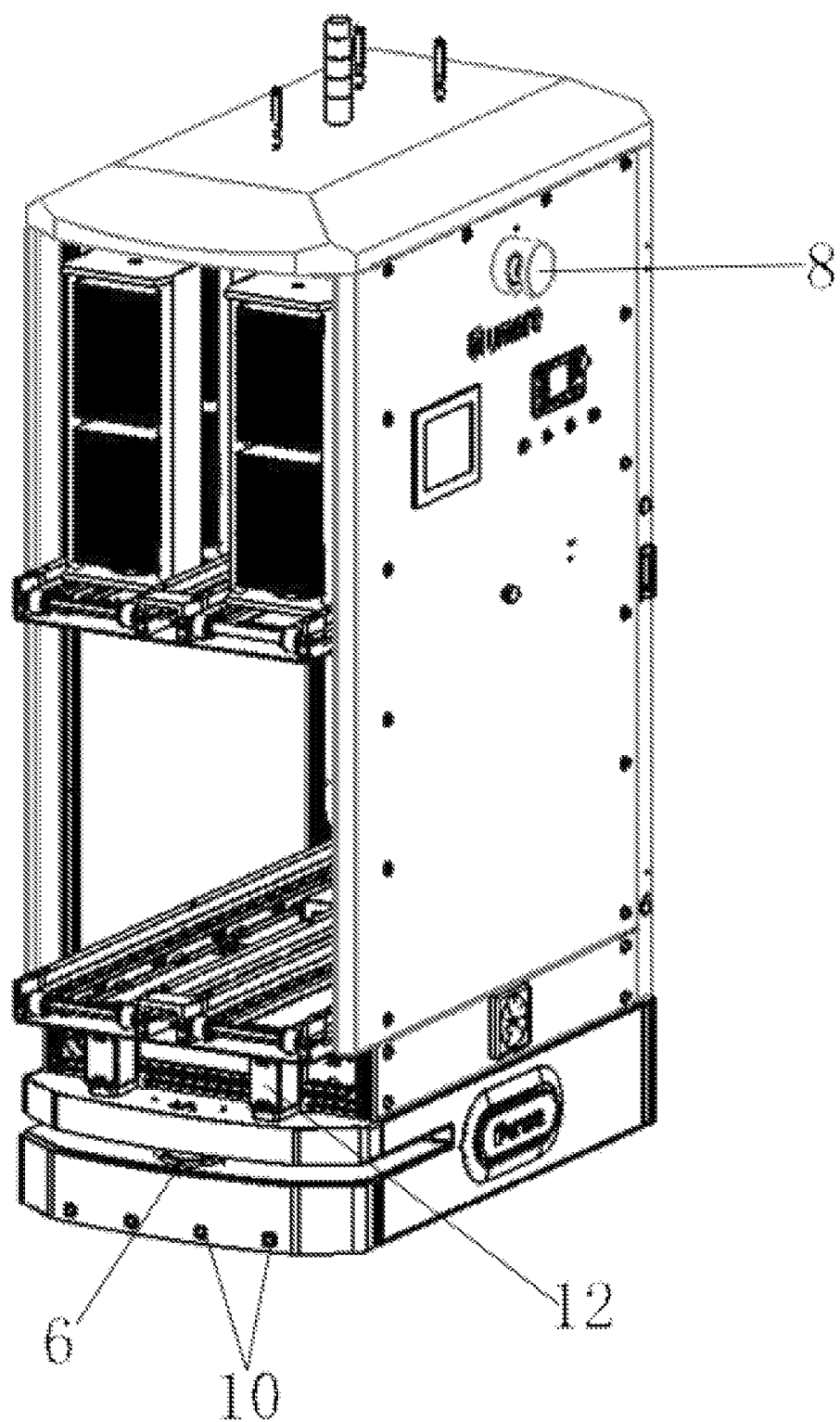
FIG. 1 is a schematic view of the structure of a mobile robot in a first embodiment of the present invention.

As shown in FIG. 1, the mobile robot that replaces the manual effort to complete the material automatic transportation includes a robot body, which is provided with a transmission line and a near field communication module. The transmission line is used for storing and transporting materials. The transmission line is a belt transmission line driven by a power source (including a gear rack, a lead screw, a cylinder, etc.). According to the production line planning of the existing photovoltaic workshop, the robot body is provided with an upper layer and a lower layer, each of which is provided with two transmission lines arranged side by side, the height spacing between the upper and lower transmission lines and the lateral spacing between the two transmission lines are determined by the transmission line at the process point of the PV shop production line. The final design is that the transmission line on the robot body and the transmission line at the process point of the workshop can be perfectly aligned. When the transmission line on the robot body is completely aligned with the transmission line at the process point of the workshop, moving in a same speed and in a same direction, the materials on the two transmission lines can be transported to each other.

Figure 3:
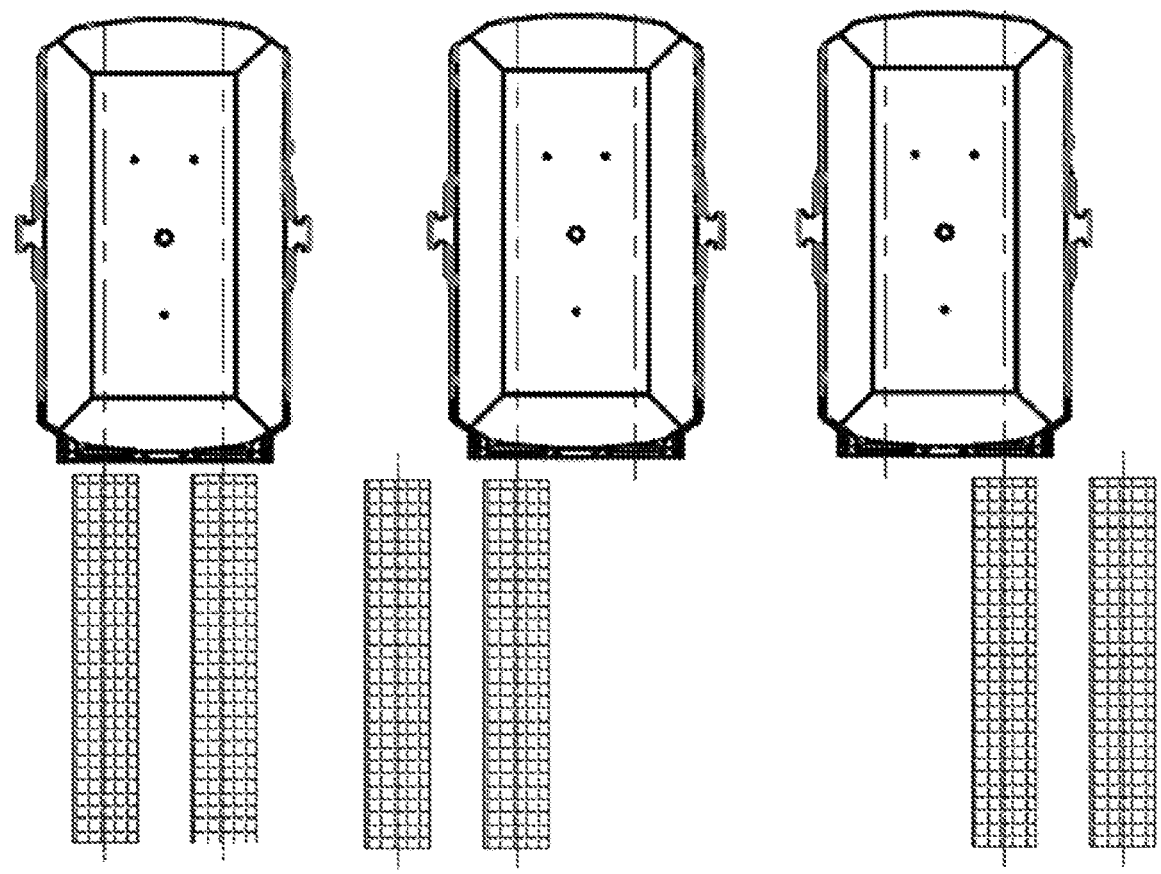
FIG. 3 is a schematic view of the structure of a docked transmission line of a mobile robot and a workshop in the present invention.

In addition, each layer is provided with two transmission lines arranged side by side, so that there are three docking modes as shown in FIG. 3, ①, the two transmission lines on the robot body are respectively connected with the two transmission lines of the workshop; ② and ③, the robot body transmission line and the workshop transmission line are docked alternately, and there are two incoming communication modules directly under the two transmission lines, so that when the mobile robot performs docking of any single transmission line, it can always ensure that the transmission line participating in the docking can engage in near field communication with the workshop production line.

By providing two layers of transmission lines, the upper and lower layers of the full material and the empty material can be completed at one time, forming a whole loop.

Figure 2:
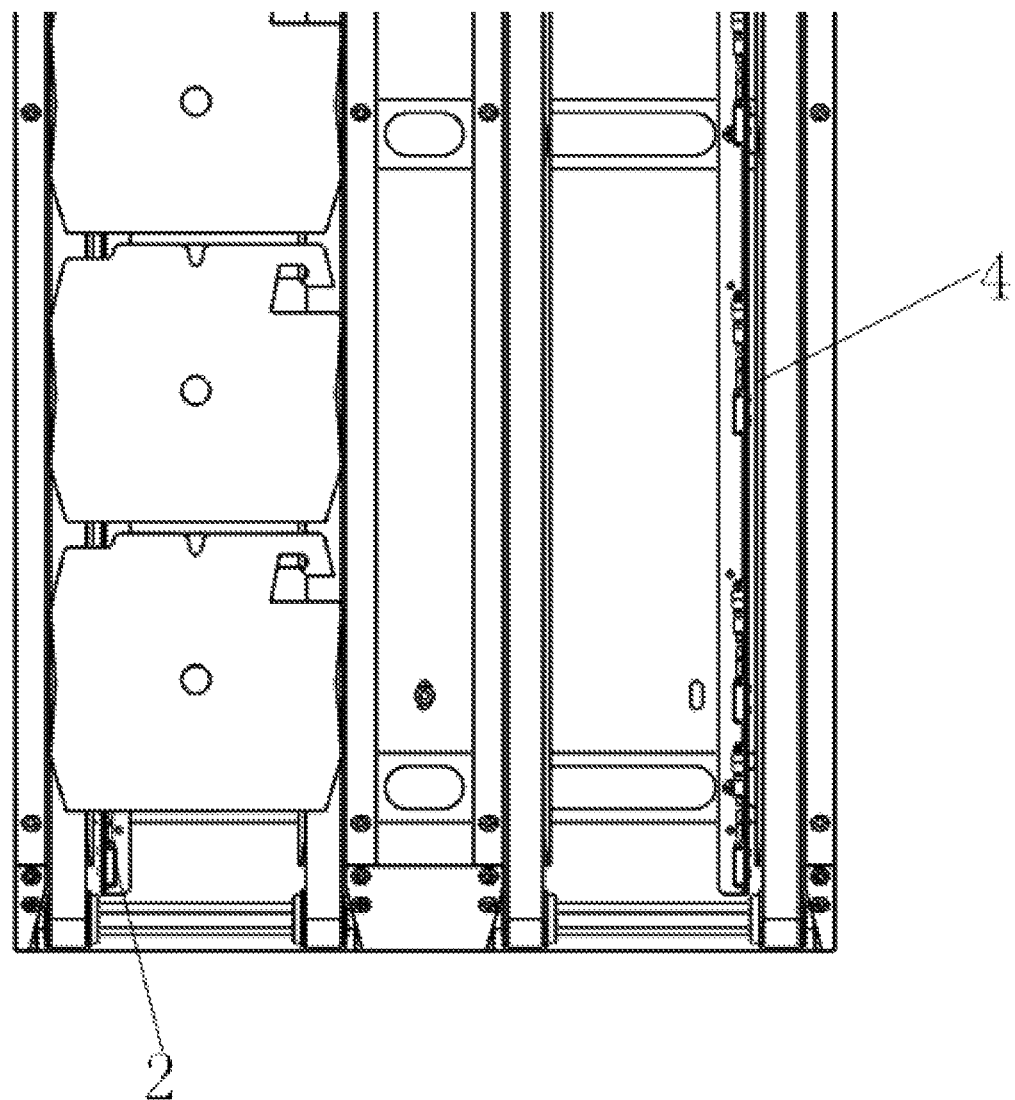
FIG. 2 is a schematic top view of a transmission line of a mobile robot in the present invention.

As shown in FIGS. 1-2, the above-mentioned robot body and the transmission line of the process point are provided with a safety sensor 2 and a non-contact sensor 4. The safety sensor 2 is used for detecting whether there is material at the installation position of the safety sensor 2; the sensor 4 is disposed at the end of the transmission line for detecting whether there is material at the end of the transmission line, to prevent the material from being jammed between the robot transmission line and the process point transmission line, any movement of any transmission line will cause the materials to drop and damage to the silicon wafer.

The front of the robot body is provided with a main laser sensor 6, and the sides of the robot body is respectively provided with a side obstacle avoidance laser sensor 8, and an ultrasonic sensor 10 is disposed both in front and rear of the robot body. The main laser sensor 6 is used for scanning an entire plane where the robot body is located, conducting the positioning and danger warning of the robot body by means of the plane features; the ultrasonic sensor 10 is used for detecting obstacles near the ground to prevent the robot body from danger of colliding with obstacles during the movement; the side obstacle avoidance laser sensor 8 is used to scan both sides of the scanning robot body, and the side obstacle avoidance laser sensor 8 can detect floating obstacles in the air.

The robot body further has a near field communication module 12, a positioning and navigation module, a path planning module, an auxiliary positioning module, a position detecting module and a central controller. The near field communication module is disposed directly below the transmission line; the transmission line is used for storing and transporting materials; the positioning and navigation module is configured to guide the robot body to move to a target position, and the auxiliary positioning module is used for guiding the robot body to be accurately located at the target position; the near field communication module is configured to communicate with a target process point near field when the mobile robot is positioned at a target location; the path planning module is configured to plan a path of the robot body moving from one target position to another; the position detection module is used for position confirmation when the robot body is located at the target position; the central controller is used for analyzing and processing data in the robot's software.

The robot body of the embodiment moves to a target position by the positioning and navigation module, but the positional accuracy based on the positioning and navigation cannot meet the requirement of transporting material in the embodiment, so an auxiliary positioning module is additionally designed. When the robot body moves to the target position, the auxiliary positioning module is used to locate the current position of the mobile robot; the above auxiliary positioning module includes but is not limited to the following three technical solutions:

The first technical solution: a magnetic strip disposed on the ground and a magnetic strip detecting sensor disposed on the robot body. A magnetic strip is laid on the ground close to the target position, and the position of the magnetic strip has been accurately positioned in advance. When the magnetic strip detecting sensor detects the magnetic strip, the current position of the robot body is accurately positioned. In actual installation, the magnetic strip is laid at a position from the target position. For example, from the process point transmission line $\Delta L$, assuming $\Delta L$ is the distance suitable for docking of the robot body transmission line and the process point transmission line, if the magnetic strip detecting sensor detects the magnetic strip, it stops immediately, and at this time, the robot body transmission line and the process point transmission line can be docked.

The second technical solution: an identifier with precise positioning at the target position and an identification sensor disposed on the robot body, the principle is as same as that in the first technical solution.

The third technical solution: a color ribbon disposed on the ground and a visual sensor disposed on the robot body, and the principle is as same as the first technical solution.

The robot body of the embodiment finds the process points by the positioning and navigation module and the auxiliary positioning module, but these positioning methods are inevitably having errors. Therefore, in order that the robot body and the production line can safely and reliably transport the materials with certain errors s, in the technical solution of the embodiment, a "material position self-correction design" is performed on the robot body. The technical solution for realizing the material position self-correction includes but not limited to the following two technical solutions:

The first technical solution: a "horn-shaped" introduction port is designed at the joint of the robot body transmission line.

The second technical solution: a sliding rail is installed on the transmission line.

The specific steps to complete the transportation of materials (flower baskets or lamination boxes) between process points of a photovoltaic production line with one or more mobile robots with the above structure are:

(1) The MES system of the photovoltaic production line generates task information according to the actual production situation. The task information includes at least a process point from which the materials are taken, a process point to which the materials are discharged, material quantity to be taken and material quantity to be discharged. The MES system sends the task information to the first process point and the second process point. After the first process point and the second process point receive the task information, they analyze whether the material entry and exit conditions are met, which include whether there is required quantity of materials. When the first process point and the second process point meet the material entry and exit conditions simultaneously, the MES system sends the task information to the robot scheduling system.

(2) The robot scheduling system receives the task information sent by the MES system, and sends the task information to the mobile robot that is most suitable for performing the task, wherein the logic of the robot scheduling system to select the most suitable mobile robot for the task includes: moving to the first process point in the shortest time, moving to the first process point in the shortest distance, and improving the usage rate of mobile robots. The above three logics can form four different priorities according to different working environments:

The first priority: moving to the first process point in the shortest time takes precedence over moving to the first process point in the shortest distance, and the distance to the first process point is prioritized to improving the usage rate of mobile robots.

The second priority: moving to the first process point in the shortest distance takes precedence over moving to the first process point in the shortest time, and moving to the first process point in the shortest time is prioritized to improving the usage rate of mobile robots.

The third priority: improving the usage rate of mobile robots takes precedence over moving to the first process point in the shortest time, and moving to the first process point in the shortest time is prioritized to moving to the first process point in the shortest distance.

The fourth priority: improving the usage rate of mobile robots takes precedence over moving to the first process point in the shortest distance, and moving to the first process point in the shortest distance is prioritized to moving to the first process point in the shortest time.

(3) The mobile robot receives the task information sent by the robot scheduling system, and the mobile robot autonomously navigates to the first process point according to an on-site map, and is precisely positioned at the docking point with the transmission line of the first process point by the auxiliary positioning system. At this time, the mobile robot and the first process point determines whether the material transmission condition is satisfied based on near field communication. When the material transmission condition is met, the transmission line on the mobile robot and the transmission line at the first process point are docked, and the two transmission lines are moved at a same speed and in the same direction. The material at the first process point is transported to the mobile robot;

At this point, after the transmission line on the mobile robot and the transmission line at the first process point are docked, the steps of completing the material transportation include:

(S1) The first process point and the mobile robot exchange handshake signals;

(S2) After the first process point and the mobile robot handshake successfully, the first process point sends its current material status to the mobile robot, and the mobile robot analyzes the material status of the first process point, generating an action instruction and sending the action instruction to the first process point. The action instruction includes the transmission line serial number of the docked transmission line, the transmission line direction, transmission speed, and transmission time;

(S3) The first process point receives the action instruction, determines whether there is a conflict with the current material, and executes the action instruction when there is no conflict. The transmission line on the first process point and the transmission line on the mobile robot move in a same speed and in the same direction. The materials are transferred one by one from the transmission line on the first process point to the transmission line on the mobile robot;

(S4) The first process point reads and stores the information of the taken materials one by one, and updates the information list; the mobile robot reads and stores the information of the incoming materials one by one, and updates the information list;

(S5) The mobile robot detects whether there are materials at the end of the transmission line, and if there is no material, it sends a detach request to the first process point. The first process point receives the detach request, and detects whether there are materials at the end of its own transmission line, and if there is no material, it sends a consent to the mobile robot. The mobile robot receives the request of detach consent and then retreats to completes one transportation task;

(S6) After the completion of one task, the mobile robot transmits the updated information list to the robot scheduling system, and the first process point transmits the updated information list to the MES system.

(4) The mobile robot autonomously navigates to the second process point, and the mobile robot and the second process point determine whether the material transmission condition is satisfied based on near field communication. The transmission line on the mobile robot is docked with that at the second process point when the material transmission condition is satisfied. After being docked, the two transmission lines move in a same speed and in the same direction, and the materials on the mobile robot are transported to the second process point.

At this point, after the transmission line on the mobile robot and the transmission line at the second process point are docked, the steps of completing the material transportation include:

(S1) The second process point and the mobile robot exchange handshake signals;

(S2) After the second process point and the mobile robot handshake successfully, the second process point sends its current material status to the mobile robot, and the mobile robot analyzes the material status of the second process point, generating an action instruction and sending the action instruction to the second process point. The action instruction includes the transmission line serial number of the docked transmission line, transmission direction, transmission speed, and transmission time;

(S3) The second process point receives the action instruction, determines whether there is a conflict with the current material, and executes the action instruction when there is no conflict. The transmission line on the mobile robot and the transmission line on the second process point move in a same speed and in the same direction. The materials are transferred one by one from the transmission line on the mobile robot to the transmission line on the second process point;

(S4) The mobile robot reads and stores the information of the currently discharged materials one by one, and updates the information list; the second process point reads and stores the information of the current taken materials one by one, and updates the information list;

(S5) The mobile robot detects whether there is material at the end of the transmission line, and sends a detach request to the second process point when there is no material. The second process point receives the detach request, and detects whether there is material at the end of its own transmission line, and sends the detach agreement to the mobile robot when there is no material. The mobile robot receives the request of detach agreement and then retreats to complete one transportation task;

(S6) After the completion of one task, the mobile robot transmits the updated information list to the robot scheduling system, and the second process point transmits the updated information list to the MES system.

In the above, after the mobile robot is positioned at the process point, the two communicate based on near field communication. In the technical solution of the embodiment, the near field communication is realized by one of the methods of infrared, RFID, NFC, Bluetooth, sound wave, etc. to realize the data transmission between the mobile robot and the production line near the process point, and the interaction, handshake, command transmission and reception verification, operation completion verification and error reporting between the mobile robot and the process point are achieved through near field communication. The near field communication is safe, stable and fast, ensuring that the materials can be transported stably after the docking.

Embodiment II

The embodiment provides a material transportation system between process points of a photovoltaic production line, including a robot scheduling system and a mobile robot. The robot scheduling system obtains task information and sends the task information to the most suitable mobile robot for task execution. The task information includes at least a process point from which the materials are taken, a process point to which the materials are discharged, material quantity to be taken, and material quantity to be discharged.

The mobile robot receives instructions sent by the robot scheduling system to transport materials from one process point to another, and the near field communication module is provided both on the mobile robot and the process point, and the mobile robot and the process point dock based on near field communication to take or discharge materials.

The specific steps to complete the material (flower baskets) transportation between the process points of the photovoltaic production line with one or more mobile robots with the above structure are:

(1) The MES system of the photovoltaic production line generates task information according to the actual production situation. The task information includes at least a process point from which the materials are taken, a process point to which the material are discharged, material quantity to be taken and material quantity to be discharged. The MES system sends the task information to the first process point and the second process point. After the first process point and the second process point receive the task information, they analyze whether the material entry and exit conditions are met, which include whether there is required quantity of materials. When the first process point and the second process point meet the material entry and exit conditions simultaneously, the MES system sends the task information to the robot scheduling system.

(2) The robot scheduling system receives the task information sent by the MES system, and sends the task information to the mobile robot that is most suitable for performing the task, wherein the logic of the robot scheduling system to select the most suitable mobile robot for the task includes: moving to the first process point in the shortest time, moving to the first process point in the shortest distance, and improving the usage rate of mobile robots. The above three logics can form four different priorities according to different working environments:

The first priority: moving to the first process point in the shortest time takes precedence over moving to the first process point in the shortest distance, and the distance to the first process point is prioritized to improving the usage rate of mobile robots.

The second priority: moving to the first process point in the shortest distance takes precedence over moving to the first process point in the shortest time, and moving to the first process point in the shortest time is prioritized to improving the usage rate of mobile robots.

The third priority: improving the usage rate of mobile robots takes precedence over moving to the first process point in the shortest time, and moving to the first process point in the shortest time is prioritized to moving to the first process point in the shortest distance.

The fourth priority: improving the usage rate of mobile robots takes precedence over moving to the first process point in the shortest distance, and moving to the first process point in the shortest distance is prioritized to moving to the first process point in the shortest time.

(3) The mobile robot receives the task information sent by the robot scheduling system, and the mobile robot autonomously navigates to the first process point according to an on-site map, and is precisely positioned at the docking point with the transmission line of the first process point by the auxiliary positioning system. At this time, the mobile robot and the first process point determines whether the material transmission condition is satisfied based on near field communication. When the material transmission condition is met, the transmission line on the mobile robot and the transmission line at the first process point are docked, and the two transmission lines are moved at a same speed and in the same direction. The material at the first process point is transported to the mobile robot;

At this point, after the transmission line on the mobile robot and the transmission line at the first process point are docked, the steps of completing the material transportation include:

(S1) The first process point and the mobile robot exchange handshake signals;

(S2) After the first process point and the mobile robot handshake successfully, the first process point sends its current material status to the mobile robot, and the mobile robot analyzes the material status of the first process point, generating an action instruction and sending the action instruction to the first process point. The action instruction includes the transmission line serial number of the docked transmission line, the transmission line direction, transmission speed, and transmission time;

(S3) The first process point receives the action instruction, determines whether there is a conflict with the current material, and executes the action instruction when there is no conflict. The transmission line on the first process point and the transmission line on the mobile robot move in a same speed and in the same direction. The materials are transferred one by one from the transmission line on the first process point to the transmission line on the mobile robot;

(S4) The first process point reads and stores the information of the taken materials one by one, and updates the information list; the mobile robot reads and stores the information of the incoming materials one by one, and updates the information list;

(S5) The mobile robot detects whether there are materials at the end of the transmission line, and if there is no material, it sends a detach request to the first process point. The first process point receives the detach request, and detects whether there are materials at the end of its own transmission line, and if there is no material, it sends a consent to the mobile robot. The mobile robot receives the request of detach consent and then retreats to completes one transportation task;

(S6) After the completion of one task, the mobile robot transmits the updated information list to the robot scheduling system, and the first process point transmits the updated information list to the MES system.

(4) The mobile robot autonomously navigates to the second process point, and the mobile robot and the second process point determine whether the material transmission condition is satisfied based on near field communication. The transmission line on the mobile robot is docked with that at the second process point when the material transmission condition is satisfied. After being docked, the two transmission lines move in a same speed and in the same direction, and the materials on the mobile robot are transported to the second process point.

At this point, after the transmission line on the mobile robot and the transmission line at the second process point are docked, the steps of completing the material transportation include:

(S1) The second process point and the mobile robot exchange handshake signals;

(S2) After the second process point and the mobile robot handshake successfully, the second process point sends its current material status to the mobile robot, and the mobile robot analyzes the material status of the second process point, generating an action instruction and sending the action instruction to the second process point. The action instruction includes the transmission line serial number of the docked transmission line, transmission direction, transmission speed, and transmission time;

(S3) The second process point receives the action instruction, determines whether there is a conflict with the current material, and executes the action instruction when there is no conflict. The transmission line on the mobile robot and the transmission line on the second process point move in a same speed and in the same direction. The materials are transferred one by one from the transmission line on the mobile robot to the transmission line on the second process point;

(S4) The mobile robot reads and stores the information of the currently discharged materials one by one, and updates the information list; the second process point reads and stores the information of the current taken materials one by one, and updates the information list;

(S5) The mobile robot detects whether there is material at the end of the transmission line, and sends a detach request to the second process point when there is no material. The second process point receives the detach request, and detects whether there is material at the end of its own transmission line, and sends the detach agreement to the mobile robot when there is no material. The mobile robot receives the request of detach agreement and then retreats to complete one transportation task;

(S6) After the completion of one task, the mobile robot transmits the updated information list to the robot scheduling system, and the second process point transmits the updated information list to the MES system.

In addition, the mobile robot in the technical solution of the embodiment further possesses the following functions:

(1) Autonomous charging system

The mobile robot includes a battery inside to provide power. When the battery level is lower than a set threshold after a long time running, it will automatically charge at a charging station. After charging is completed, it can be automatically added to the task sequence, waiting for the system to assign tasks. Besides, the mobile robot that has not been assigned to a task for a long time will automatically go to charge. No manual intervention is required for the charging process. In practice, the charging pile can be arranged at a suitable position in the workshop to form a charging system, which will provide guarantee for 24-hour operation of the mobile robot.

(2) Security ensuring and exception handling

There are several exceptions that may occur on mobile robots:

1. Before the process point of the workshop, although there is the assistance of the auxiliary positioning, the position accuracy still does not reach the required level, so the transmission line on the mobile robot and the workshop transmission line cannot be accurately aligned. There is a risk of material loss performing material transfer in this case.

Guarantee method: After the mobile robot completes the positioning with the assistance of the auxiliary positioning system, the position detection module will perform position confirmation. The position detection module will only give the position accurate signal when the error falls within an allowable value range. This signal information will be exchanged with the mobile robot through the near field communication module. If the position is not accurate, the material transportation will not occur, and the mobile robot will exit the docking area to re-dock, or give a signal to request manual intervention.

2. The mobile robot is faulty when the mobile robot itself is loaded with materials.

Guarantee method: In this case, a fault information will be sent to the robot scheduling system through the communication system in the workshop, and then the scheduling system will send out this information and request manual intervention to solve the problem. At the same time, the robot scheduling system will dispatch an alternative mobile robot to the fault handling area, and assign the task of the faulty mobile robot to the alternative robot. A technician needs to manually load the materials on the faulty robot onto the alternative robot, and scan the faulty mobile robot's material information through a scanner during the loading process, and record the material information into the alternative robot. Then they need to manually start the alternative robot to continue the task. At this point, the alternative robot will continue the task assigned by the scheduling system that the failed robot has not performed.

The embodiments described above are only preferred embodiments for the purpose of fully illustrating the present application, but the scope of protection of the present application is not limited thereto. Equivalent substitutions or alterations made by those skilled in the art based on this application are within the scope of protection of the present application. The protection scope of this application is defined by the claims.

The invention claimed is:

1. A method for transporting materials between process points of a photovoltaic production line, characterized in that a mobile robot receives instructions to transport materials from one process point to another, and the mobile robot and the process point dock based on near field communication to take or discharge materials, the method comprising the following steps:
(1) obtaining a task information of a task by a robot scheduling system, and sending the task information to a mobile robot which is adapted for performing the task, the task information includes at least a process point from which the materials are taken, a process point to which the materials are discharged, material quantity to be taken, and material quantity to be discharged;
(2) receiving the task information by the mobile robot, and moving the mobile robot to a first process point by autonomous navigation, and determining whether a first material transmission condition is satisfied based on near field communication between the mobile robot and the first process point, when the first material transmission condition is satisfied, a transmission line on the mobile robot is docked with a transmission line at the first process point, and the materials at the first process point are transported to the mobile robot; and
(3) autonomously navigating the mobile robot to a second process point, and determining whether a second material transmission condition is satisfied based on near field communication between the mobile robot and the second process point, when the second material transmission condition is satisfied, the transmission line on the mobile robot is docked with a transmission line on the second process point and the materials on the mobile robot are transported to the second process point;
wherein in step (2), selection criteria that the robot scheduling system selects the mobile robot to perform the task include: moving to the first process point in a shortest time, moving to the first process point in a shortest distance, and improving a usage rate of the mobile robot.

2. The method for transporting materials between process points of a photovoltaic production line according to claim 1, characterized in that: when the mobile robot moves to a position near the process point, an auxiliary positioning system is used to locate a current position of the mobile robot; the auxiliary positioning system includes,
a magnetic strip disposed on the ground and a magnetic strip detecting sensor disposed on the mobile robot;
or a marker with a precise position disposed at a target position and an identification sensor disposed on the mobile robot;
or a ribbon disposed on the ground and a visual sensor disposed on the mobile robot.

3. The method for transporting materials between process points of a photovoltaic production line according to claim 1, further comprising:
generating the task information by an MES (Manufacturing Execution System) system of the photovoltaic production line on the basis of production situation, and
sending the task information to the first and second processing point, after receiving the task information, wherein the first and second processing point analyze whether conditions of materials entry and output are satisfied, and when the materials entry and exit conditions of the first process point and the second process point are satisfied simultaneously, the MES system sends the task information to the robot scheduling system.

4. The method for transporting materials between process points of a photovoltaic production line according to claim 3, characterized in that:
after the transmission line on the mobile robot and the transmission line at the process point are docked, the steps of completing the materials transportation comprise:
(S1) the process point and the mobile robot exchange handshake signals;
(S2) after the process point and the mobile robot shake hands successfully, the process point sends its current material status to the mobile robot, and the mobile robot analyzes the material status of the process point, generates an action command, and sends the action command to the process point, the action command includes a transmission line serial number of the docked transmission line, the transmission line direction, transmission speed and transmission time;
(S3) the process point receives the action command and determines whether there is a conflict with the current material, executing the action command when there is no conflict,
the transmission line on the process point and that on the mobile robot moves at a same speed and in a same direction, and the materials are one by one transferred from the transmission line on the process point to the transmission line on the mobile robot, or are one by one transferred from the transmission line on the mobile robot to the transmission line on the process point;
(S4) taking the materials from reads and storing the information of the taken materials one by one in an information list, and updating the information list; the receiver of the materials reads and stores the information of the incoming materials one by one, and updates the information list;
(S5) the mobile robot detects whether there are materials at the end of the transmission line, and if there is no material, the mobile robot sends a detach request to the process point, the process point receives the detach request, and detects whether there are materials at the end of the transmission line, and if there is no material, the process point sends a consent to the mobile robot, after receiving the consent to detach, the mobile robot retreats and completes one transportation task;

(S6) after the completion of one task, the mobile robot transmits the updated information list to the robot scheduling system, and the process point transmits the updated information list to the MES system.

5. A material handling system between process points of a photovoltaic production line, comprising:
a mobile robot receiving instructions to transport materials from one process point to another,
wherein both the mobile robot and process point are provided with a near field communication module, and
the mobile robot and the process point dock based on the near field communication to take or discharge materials, and
a robot scheduling system, wherein, the robot scheduling system obtains task information and sends the task information to the mobile robot for the task,
wherein the task information includes at least a process point from which the materials are taken, a process point to which the materials are discharged, material quantity to be taken, and material quantity to be discharged;
wherein the mobile robot receives task information from the robot scheduling system, and moves to a first process point by autonomous navigation, and the mobile robot and the first process point determine whether a material transmission condition is satisfied based on near field communication between the mobile robot and the first process point, and if the material transmission condition is met, a transmission line of the mobile robot is docked with a transmission line at the first process point, and materials at the first process point are transported to the mobile robot; and
wherein after the mobile robot takes materials from the first process point, the robot autonomously navigates to a second process point, and the mobile robot and the second process point determine whether a material transmission condition is satisfied based on near field communication, and if the material transmission condition is satisfied, the transmission line of the mobile robot is docked with a transmission line at the second process point and materials on the mobile robot are transported to the second process point.

6. A mobile robot, comprising:
a robot body, a transmission line, a near field communication module, a positioning and navigation module,
a path planning module, an auxiliary positioning module, a position detecting module, and a central controller,
wherein the near field communication module is disposed directly below the transmission line;
the transmission line is used for storing and transporting materials;
the positioning and navigation module is configured to guide the robot body to move to a target position, and
the auxiliary positioning module is used for guiding the robot body to be accurately located at the target position;
the near field communication module is used to let the mobile robot communicate with a target process point when the mobile robot is positioned at the target location;
the path planning module is configured to plan a path for the robot body moving from one target position to another;
the position detection module is used for position confirmation when the robot body is located at the target position;
the central controller is used for analyzing and processing data in the mobile robot's software.

7. The mobile robot according to claim 6, characterized in that: the robot body is provided with a main laser sensor, an ultrasonic sensor, a side obstacle avoidance laser sensor, a safety sensor and a non-contact sensor, wherein the main laser sensor scans an entire plane where the robot body is located, for positioning of the robot body and danger warning by means of plane features; the ultrasonic sensor is used for detecting obstacles near the ground; the side obstacle avoidance laser sensor is used for scanning both sides of the robot body; the safety sensor is used to detect whether there is material at installation position of the safety sensor; the non-contact sensor is disposed at an end of a transmission line for detecting whether there is material at the end of the transmission line.

* * * * *